United States Patent
Jessop

(10) Patent No.: US 10,847,023 B2
(45) Date of Patent: Nov. 24, 2020

(54) INFORMATION PROCESSING SYSTEM AND METHOD

(71) Applicant: Metis Technology Solutions, Inc., Albuquerque, NM (US)

(72) Inventor: Richard Karle Jessop, Williamsburg, VA (US)

(73) Assignee: METIS TECHNOLOGY SOLUTIONS, INC., Albuquerque, NM (US)

(*) Notice: Subject to any disclaimer, the term of this patent is extended or adjusted under 35 U.S.C. 154(b) by 0 days.

(21) Appl. No.: 16/442,059

(22) Filed: Jun. 14, 2019

(65) Prior Publication Data

US 2019/0311610 A1 Oct. 10, 2019

Related U.S. Application Data

(63) Continuation of application No. PCT/US2017/066438, filed on Dec. 14, 2017.
(Continued)

(51) Int. Cl.
*G08C 17/02* (2006.01)
*G08B 21/02* (2006.01)
(Continued)

(52) U.S. Cl.
CPC ............ *G08C 17/02* (2013.01); *G08B 21/02* (2013.01); *G08B 21/18* (2013.01); *H04H 60/73* (2013.01);
(Continued)

(58) Field of Classification Search
CPC ........ G08C 17/02; G08B 21/02; G08B 21/18; H04H 60/73; H04N 1/00137; H04N 21/84;
(Continued)

(56) References Cited

U.S. PATENT DOCUMENTS 5,319,363 A * 6/1994 Welch ................... H04Q 9/00
340/12.3
7,417,650 B1 * 8/2008 Horvitz .................. G06F 9/451
715/765

(Continued)

FOREIGN PATENT DOCUMENTS

WO 2014/173274 10/2014
WO 2016/000035 1/2016

*Primary Examiner* — Franklin D Balseca
(74) *Attorney, Agent, or Firm* — Peacock Law P.C.; Janeen Vilven

(57) ABSTRACT

An information processing system for monitoring a system. An embodiment of the present invention is a system (and concomitant methods and computer software embodied in non-transitory computer readable media) providing prioritized information and several extensions. These extensions include improved information flow between actors that participate in monitoring the system. These actors each have a model of its environment and may include either human operators, computational or software systems, or hardware systems that can act on information; for example, a pilot flying, a pilot monitoring, an aircraft itself, and responses taken and electronics readings therein. Components of the system comprise a metadata workbench, an information source, a condition monitor, and a notification terminal.

21 Claims, 3 Drawing Sheets

Related U.S. Application Data

(60) Provisional application No. 62/434,269, filed on Dec. 14, 2016.

(51) Int. Cl.
  *G08B 21/18* (2006.01)
  *H04H 60/73* (2008.01)
  *H04N 1/00* (2006.01)
  *H04N 21/84* (2011.01)
  *H04Q 9/00* (2006.01)

(52) U.S. Cl.
  CPC ......... *H04N 1/00137* (2013.01); *H04N 21/84* (2013.01); *H04Q 9/00* (2013.01); *H04Q 2209/00* (2013.01); *H04Q 2209/30* (2013.01); *H04Q 2209/40* (2013.01); *H04Q 2209/70* (2013.01); *H04Q 2209/86* (2013.01)

(58) Field of Classification Search
  CPC .. H04Q 9/00; H04Q 2209/00; H04Q 2209/30; H04Q 2209/40; H04Q 2209/70; H04Q 2209/86
  See application file for complete search history.

(56) References Cited

U.S. PATENT DOCUMENTS

| | | | |
|---|---|---|---|
| 2004/0243636 A1* | 12/2004 | Hasiewicz | G05B 23/0251 |
| 2014/0218187 A1 | 8/2014 | Chun et al. | |
| 2014/0247154 A1 | 9/2014 | Proud | |
| 2016/0293133 A1 | 10/2016 | Dutt | |

* cited by examiner

INFORMATION PROCESSING SYSTEM AND METHOD

CROSS-REFERENCE TO RELATED APPLICATIONS

This application is a continuation application of International Patent Application No. PCT/US2017/066438, entitled "Information Processing System and Method", filed on Dec. 14, 2017, which claims priority and the benefit of the filing of U.S. Provisional Patent Application No. 62/434,269, entitled "Intelligent Information Processing System", filed on Dec. 14, 2016, and the specification and claims thereof are incorporated herein by reference.

STATEMENT REGARDING FEDERALLY SPONSORED RESEARCH OR DEVELOPMENT

This invention was made with government support under Contract No. NNX16CL70P and NNX17CL03C awarded by the National Aeronautics and Space Administration (NASA). The government has certain rights in the invention.

THE NAMES OF PARTIES TO A JOINT RESEARCH AGREEMENT

Not Applicable.

INCORPORATION BY REFERENCE OF MATERIAL SUBMITTED ON A COMPACT DISC

Not Applicable.

STATEMENT REGARDING PRIOR DISCLOSURES BY THE INVENTOR OR A JOINT INVENTOR

Not Applicable.

COPYRIGHTED MATERIAL

Not Applicable.

BACKGROUND OF THE INVENTION

Field of the Invention (Technical Field)

The present invention relates to an information processing system. In today's normal operations, there can be an extremely high volume and frequency of data flow of information produced from a monitored system. As monitored systems continue produce exceedingly high volumes of information at high frequencies while in operation, a person would be unable to process and report such information. Furthermore, it is usually unknown whether information presented to a flight crew is received in a meaningful manner, processed and then used, discounted, or ignored. It is also unknown whether the decisional models of a flight crew are accurate, confused, or inconsistent. Information is often presented without integration from other sources which the flight crew then needs to independently synthesize. Information is presented without justification, without regard to situational importance or relevance, and rarely in a highly abstract level. Presentation of information at an abstract level is desirable because when details are reduced to a direct instruction to the operator for what to do, how to respond, or how to correct an issue, correct decision making is more easily justified and executed rather than delayed because of required additional considerations.

Currently, there is no mechanism for airlines to verify and validate that standard operating procedures are sound and are being executed properly by flight crews. Because modification of instrumentation is both prohibitively expensive and would require long delays, implementing an embodiment of an information processing system on an electronic flight bag is far more practical in terms of cost and time. An electronic flight bag is a computational device that is mounted on the side of the flight deck and is used to provide pilots with flight information. The device is not integrated with the flight deck hardware or software. An embodiment of an information processing system that can be used in flight training systems is described herein and can provide a way to determine if a pilot is performing adequately by giving notifications regarding performance. An embodiment of an information processing system gives notifications, which either notify if there is a serious flight-related problem, or if the information processing system functionality needs to be improved.

Further, despite the unprecedented safety record of aviation, aviation accidents continue to occur. These accidents are well understood and their root cause is assigned in a straightforward manner. Although the accidents have been pigeonholed into very specific accident categories, a further analysis of accidents from the perspective of faulty information flows and decisional models based on available data and evidence can be attached to each of the actions that are considered to make up the error chain. Once the faulty information flow or assumed cognitive disconnect has been identified, one can reasonably determine what information may have been useful or what actions should have been taken to resolve the cognitive disconnect. Through a notification terminal, this information can be presented which then would eliminate each item that makes up the error chain and thus prevent, lessen or mitigate the severity of the accident or incident. The significance of this is to provide a system that performs the processing work efficiently behind the scenes. While there are many avionic systems that present both safety-critical and non-safety critical alerts to pilots, they do not change and update the urgency level of the presentation based on data indicative of an operator's mental and/or physical state. Further, they do not have a way of modelling the operator's mental and/or physical state. An embodiment of an information processing system of the present invention fills this gap by triaging important information and transmitting it at an optimal time, which may break error chains and prevent accidents from occurring.

BRIEF SUMMARY OF THE INVENTION

One embodiment of the present invention provides for an information processing system integrated on a monitored system. The information processing system comprising an information source capable of i) receiving metadata from the monitored system, and ii) transmitting that metadata to a metadata workbench or to a condition monitor. The metadata workbench is capable of communication with one or more of the following: the condition monitor, the information source, and a notification terminal. The metadata workbench is capable of reading instrument state changes of the monitored system. The information source may comprise a first information source state vector and a first modified information source state vector. The first modified information source state vector is capable of processing (for example compressing and or encrypting) the metadata from said first information source state vector and transmitting the metadata to said condition monitor. The condition monitor is capable of one or more of the following: receiving metadata as one or more conditions from the information source, monitoring the one or more conditions encoded as a data point for meeting a threshold, obtaining the relevant notification from the one or more conditions, and sending the one or more notifications to the notification terminal. The notification terminal is capable of prioritizing the one or more notifications and deploying the one or more notifications meeting a prioritization criteria for display as a displayed notification on the notification terminal of the information processing system. In another embodiment, the condition monitor comprises a second modified information source state vector and a second information source state vector. The second modified information source state vector is capable of one or more of the following: receiving information from the first modified information source state vector, further processing (for example decompressing and decrypting) the metadata received from the first modified information source state vector and communicating (for example via a network) the further processed metadata to the second information source state vector.

In one embodiment, the one or more notifications are capable of an adaptive learning. The adaptive learning is capable of one or more of the following: i) being generated by one or more conditions and comprises the adaptation or re-presentation of the one or more notifications, ii) being activated when a target operator to whom the displayed notifications does not take an appropriate or expected action, and iii) advising the target operator of the nature of a safety issue and the severity of a safety issue. In one example, the one or more notifications are transmitted to a higher authority to take some action when no action is detected by the target operator. In another example, the one or more notifications are capable of being prioritized, and communicated to the notification terminal to present information that is critical to safety of the monitored system first. For example, displayed notifications display information in a highly abstract format and/or the notification terminal comprises a display screen capable of displaying the one or more notifications as a multimedia message. Alternatively, the notification is displayed on a flight simulator interface. In a further embodiment, the notification terminal is electronics that can render the one or more notifications, for example the notification terminal is an Android tablet running the notification terminal.

In another embodiment, the information processing system is capable of recording a correct action, where the correct action is an explicit response or an implicit response.

In another embodiment, the information processing system is further comprised of software and or hardware.

In one or more embodiments, the metadata workbench is capable of recording or downloading metadata received.

Another embodiment provides an information processing system integrated on a monitored system comprising an information source capable of i) receiving metadata from the monitored system, and transmitting that metadata to a metadata workbench or to a condition monitor, said metadata workbench capable of communication with the condition monitor, the information source, and a notification terminal and wherein the metadata workbench is capable of reading instrument state changes of the monitored system via model-based information communications; the information source comprising a first information source state vector and a first modified information source state vector, the first modified information source state vector capable of transmitting the metadata to the condition monitor, the first modified information source state vector capable of processing the metadata from the first information source state vector; the condition monitor comprising a second modified information source state vector and a second information source state vector, the second modified information source state vector capable of receiving information from said first modified information source state vector that is capable of communication with the second modified information source state vector capable of further processing the metadata from the first modified information source state vector and communicating the further processed information source state vector metadata to the second information source state vector; the condition monitor capable of i) receiving metadata as one or more conditions from the information source, monitoring the one or more conditions encoded as a data point for meeting a threshold, obtaining one or more notifications from the one or more conditions, wherein the one or more notifications present safety-critical information in a highly abstract form, the threshold determined by safety considerations uniquely encoded for the specifics of the monitored system, iv) sending said one or more notifications to the notification terminal as said threshold is met, and v) adapting the one or more notifications into various multimedia formats as the one or more notifications obtain no correct action from a target operator. The notification terminal is capable of prioritizing the one or more notifications and the one or more notifications meeting a prioritization criteria for display as a displayed notification, and re-presenting the one or more notifications in various multimedia formats based on the prioritization or level of urgency determined by the notification terminal. In one embodiment, the information processing system is capable of evaluating one or more of the following: the impact of information, context, and justification based on data indicative of the mental state and/or physical state of an operator at the condition monitor. In another embodiment, the information processing system is capable of modelling the mental state of an operator at the condition monitor. The information processing system as described wherein the information processing system is capable of presenting the one or more notifications to a second higher authority system at an outside notification terminal. For example, the second higher authority system is capable of overriding the controls of the monitored system in the case of a rouge operator. Further, the information processing system wherein the presentation of the one or more notifications factors in how information, context, and justification will best alert the operator to the criticality of a specific safety issue of the monitored system. In one embodiment, the monitored system is a flight simulator interface. In one embodiment, the notification terminal is an Android tablet running said notification terminal. Additionally, the notification terminal is electronics that can render the one or more notifications. In another embodiment, the information processing system is comprised of software and/or hardware. In one embodiment, the metadata workbench is capable of recording or downloading metadata received.

Another embodiment provides for a method for obtaining information from an information processing system, the obtaining step comprises integrating the information processing system as described herein onto a monitored system.

Another embodiment provides for a method for processing information via an information processing system which comprises receiving at an information source metadata from a monitored system or a metadata workbench via a first information source state vector. The received metadata is transmitted to a metadata workbench or to a condition monitor. The received metadata is communicated to a first modified information source state vector at the information source. The received metadata is processed (for example compressing and encrypting) at the first modified information source state vector. The processed metadata is transmitted to a condition monitor comprising a second modified information source state vector and a second information source state vector. The transmitted metadata is further processed (for example decompressing and decrypting) at the second modified information source state vector. The further processed metadata is communicated to a second information source state vector. For each of the one or more conditions encoded as a data point a comparison is made to a threshold for each condition to obtain an analysis for each condition at the condition monitor. One or more notifications are sent to a notification terminal when said analysis at the condition monitor evaluates a condition that should be displayed and/or prioritizes the one or more notifications for display at the notification terminal and/or deploys the prioritized one or more notifications for display as a displayed notification. Further, the method can include recording the received metadata at the information source and downloading to the metadata workbench. The metadata workbench further communicating with one or more of: the condition monitor, the information source, and a notification terminal. Further still, the step of transmitting the received metadata may further comprise model-based information communications. The method may further comprise receiving metadata in the condition monitor as one or more conditions from the metadata workbench. The step of monitoring may further comprise determining the level of criticality to the information processing system by employing data analytics encoded in the information processing system and or detecting information disconnects between actors via machine learning. The step of receiving metadata by an information source is further configured to use model based information communications. The method may further comprise integrating the information processing system on a flight simulator interface. The step of deploying may further comprise displaying the notification on an Android tablet and/or on electronics that can render said one or more notifications. The method may further comprise an adaptive learning step wherein said adaptive learning comprises one or more notifications adapting and continuing to be modified by the condition monitor as the one or more notifications continue to be obtained from the one or more conditions. The one or more notifications are re-represented in modified formats until the system records a correct action. In one embodiment, when no correct action is recorded by the system after a safety threshold detects danger to safety, the one or more notifications are transmitted to a second system. The second system is alerted that no correct action was taken and then the second system can override the monitored system to take corrective action.

An embodiment of the present invention is a system (and concomitant methods and computer software embodied in non-transitory computer readable media) providing prioritized information and several extensions. These extensions include improved information flow between actors that participate in an aircraft's flight deck environment. These actors each have a model of its environment and may include either human operators, computational or software systems, or hardware systems that can act on information; for example, a pilot flying, a pilot monitoring, an aircraft itself, and responses taken and electronics readings therein. Components of the system comprise a metadata workbench, an information source, a condition monitor, and a notification terminal. The metadata workbench provides an integrated development and testing environment for all system component software. During the development and initial unit testing process, the operational environment is a standard office environment with access to monitored systems simulators and actual or simulated components. The metadata workbench also provides the test bed for higher level verification and validation of developed components through the use of software simulators, hardware platforms for physical integration testing, and operational systems for operational deployment testing. As the components are deemed ready for deployment to an operational environment, the metadata workbench is used to physically deploy software to the operational environment and perform all system component operational checks by feeding test data through the information sources. The final operational environment for system components is the monitored system which is typically a specific aircraft. The metadata workbench can be used to monitor the system during final integration testing and actual operations. After operations, the metadata workbench can download any flight data and systems recordings for subsequent analysis. An information source is an interface between a monitored system and the information processing system itself. An information source converts raw data provided by a monitored system into information that will be processed by the system. In one embodiment, an information source understands relevant metadata associated with the data provided by the monitored system. An information source encapsulates an interface which transmits the metadata to a metadata workbench which permits the development of conditions based on the available information. An information source encapsulates the ability to store raw data received from a monitored system for subsequent download to a metadata workbench. The operational environment of an information source is anywhere access to the raw data is available. The information source is able to communicate (for example, via a network) with either a metadata workbench or a condition monitor. The condition monitor is a process manager and a conduit for information. The condition monitor receives modified data from an information source and routes the data to conditions which explicitly use that data. When a condition evaluates to true, the condition monitor obtains the relevant notification from the condition and routes it to all relevant notification terminals. The operational environment for a condition monitor is typically onboard the monitored system but can be deployed to any environment with access to data provided by information sources. The notification terminal receives notifications from a condition monitor and renders the notification using formats defined during development with the metadata workbench. The operational environment for a notification terminal is in close proximity to the target of the notification, typically a specific pilot. A notification terminal can take the form of an electronic tablet, a wearable device, a projection device, an audio device, a headset, or any other media device which can appropriately render the received notification. The notification terminal can receive and transmit feedback to a condition monitor in the form of a button press or a verbal command or an eye-track fixation on the notification terminal. The notification terminal would not be yet another instrument included in an operational scan in order to preserve the information processing system as a safety alerting tool.

One embodiment of the present invention provides a method of operation that involves an analysis of a National Transportation Safety Board (NTSB) accident report identifying error chain events. Each event is analyzed for information disconnects between actors, operators, or agents involved in the accident. As each disconnect is identified, available information sources are analyzed and the presentation of their data is examined to determine how presentation might best be adapted to resolve the disconnect. In addition, information sources such as eye-trackers and stress detection via physiologic analyses of the operator of the monitored system, including voice or facial analyses, or their equivalents, physiologic measurements, (heart rate, blood pressure, awake/sleep status, and other biofeedback metrics) can increase the robustness of evolving models of actors. An actor, operator, or agent is any entity that can accept information and react to the received information. For example, actors can be a pilot flying, a pilot monitoring the monitored system, an air traffic controller, or an aircraft.

One aspect of one embodiment of the present invention provides efficient management of a high volume of data flow from the monitored system as applicable for a changing set of a plurality of conditions or monitoring conditions, where for example, the plurality of conditions can be in the range of 1-50, 50-100, 100-500, 500-1000, greater than 1000 checks and conditions to be monitored and processed in real time. Acquisition of the plurality of conditions in real time at a high rate, e.g., on a second by second basis, nanosecond, millisecond, minute, or hourly basis would result in a high volume of data flow where simultaneous or near simultaneous analysis would be unable to be processed and reported by a person.

One aspect of one embodiment of the present invention provides that the system enhances safety performance by eliminating or reducing information disconnects between actors operating in that environment. Information flow models are developed between actors. As discrepancies in information flow model data are detected by the condition monitor, notifications are transmitted to notification terminals that advise/alert an actor about the discrepancy. As notifications are processed, information flow models are adjusted. If a condition persists, information flow models are adjusted to reflect changes and abnormalities detected, and notifications can adapt as the situation becomes increasingly safety critical. An example of an adaptive notification could be how a pilot recognizes and recovers from a stall condition. There can be many direct indications on multiple instruments that an aircraft stall is imminent or that an aircraft is in an active stall. Each of these indications is equivalent to a system notification. There are prescribed actions that a pilot must take to avoid or recover from a stall. If the pilot is not looking at the instruments, the system can detect this condition and alert the pilot to examine particular instruments with contextual information that a stall is imminent or active. If the pilot fails to take corrective action, notifications can adapt to alert the pilot to take prescribed actions. At some point, the available data being processed may identify rogue behavior, e.g., a pilot who is not performing as expected, thereby averting accidents where the information processing system gives increasingly basic or remedial recommendations via the notification terminal to the pilot.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention.

BRIEF DESCRIPTION OF THE SEVERAL VIEWS OF THE DRAWINGS

The accompanying drawings in the attachments, which are incorporated into and form a part of the specification, illustrate one or more embodiments of the present invention and, together with the description, serve to explain the principles of the invention. The drawings are only for the purpose of illustrating one or more embodiments of the invention and are not to be construed as limiting the invention.

DETAILED DESCRIPTION OF THE INVENTION

Figure 1:
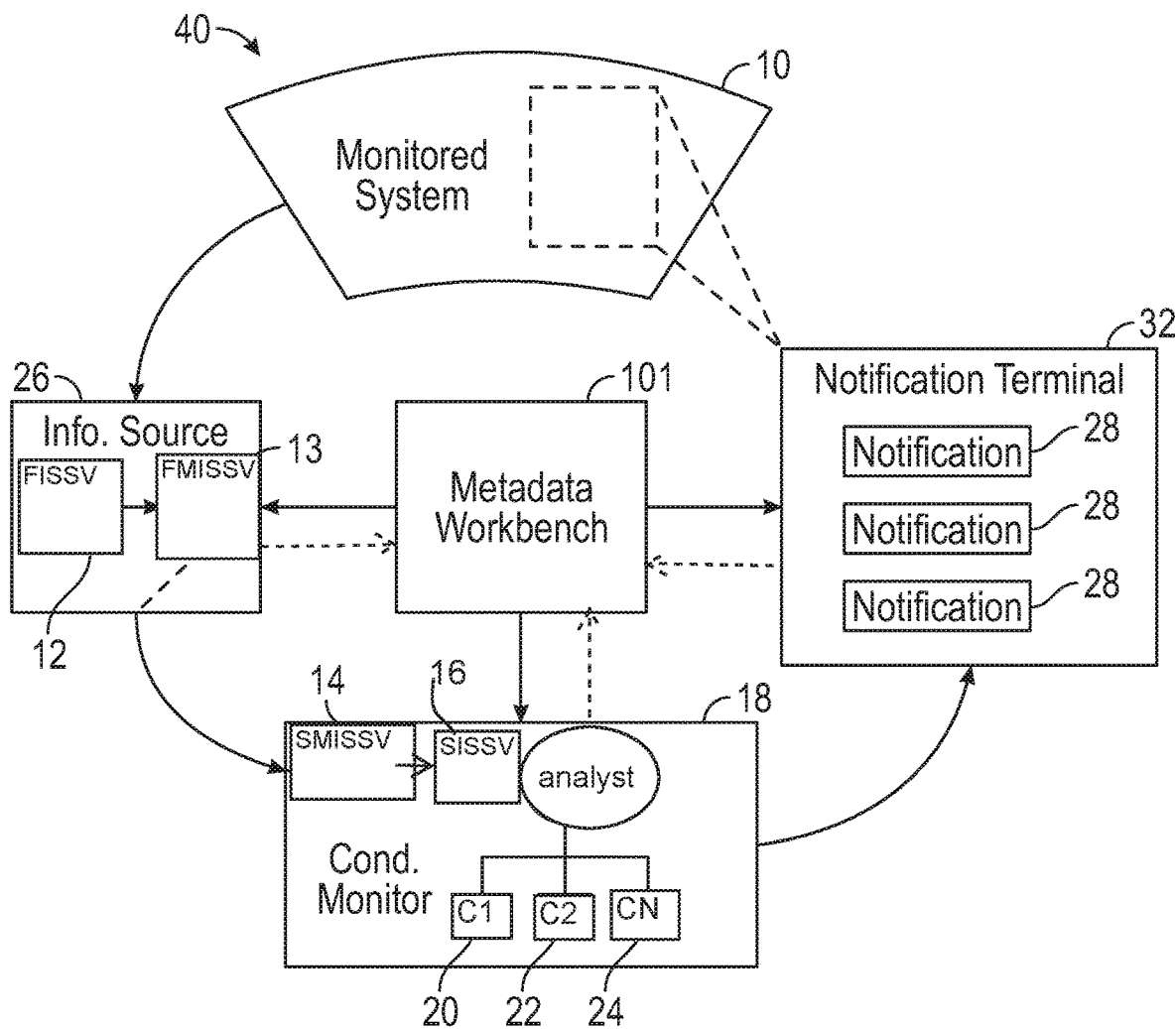
FIG. 1 shows an information processing system according to one embodiment of the present invention.

Referring now to FIG. 1, an information processing system 40 is illustrated according to one embodiment of the present invention. System information from monitored system 10 is recorded by information source 26 via first information source state vector ("FISSV") 12 which is communicated to first modified information source state vector ("FMISSV") 13, where it is compressed and encrypted and transmitted via network connection to second modified information source state vector ("SMISSV") 14, where it is decompressed and decrypted, then communicated to second information source state vector ("SISSV") 16 in condition monitor 18. Information source 26 translates raw data into an internal representation of data. Condition monitor 18 evaluates relevant conditions. If any condition evaluates to true in condition monitor 18, a safety condition exists. Condition monitor 18 requests notification 28 from the condition and transmits it to subscribed notification terminals 32. Notification terminal 32 can be a hardware device with multimedia capability running the notification terminal software.

Metadata workbench 101 provides a development, testing, monitoring, and deployment application for the system. Metadata workbench 101 interfaces and communicates with information source 26, which in addition to transmitting data to a condition monitor, contains metadata about the data provided by a monitored system. This metadata can be used by analysts to create conditions, e.g., condition one ("C1") 20, condition two ("C2") 22, to condition N ("CN") 24, where N represents conditions being monitored beyond condition two 22 and up to an unknown value of possible monitored conditions, that will be sent to condition monitor 18. Analysts can be a person or an automated system, e.g., a machine learning system. Metadata workbench 101 can also be used by analysts to create notifications 28 and the formats for their display on notification terminal 32. Metadata workbench 101 can test conditions, notifications 28, and their display on notification terminal 32 in a laboratory environment. Once approved for deployment to an operational system, e.g., monitored system 10, metadata workbench 101 deploys condition monitor 18 and notification terminal 32 to the appropriate flight deck and performs systems integration checks to verify correct operational performance. Metadata workbench 101 works with information sources 26 through Java introspection, or other programmable language. If the code is found to follow the prescribed format, the information is processed and stored in a database. In another embodiment, metadata workbench 101 receives information from info source 26, condition monitor 18 and notification terminal 32 as illustrated by the broken line arrows.

Metadata workbench 101 can be used to identify and characterize information relevant to support decision making or action taking, e.g., by a subject matter expert who is familiar with flying and flight deck operations but who is not familiar with aircraft avionics or hardware systems. Metadata workbench 101 can identify actors that can produce or consume information, their roles, and the actions that the actors can take. For example, an actor in a particular role identifies sources of information that might be useful to making a decision or taking some action. The actor identifies conditions of interest which can be measured by exemplary threshold values based on available information. Metadata workbench 101 presents metadata to the exemplary analyst. Metadata can include such items as name, data type, data size, data range, sampling frequency, cost of sampling, security requirements, and other details. From this data, the analyst can create exemplary conditions which can be deployed to condition monitor 18. Information processing system 40 can filter what might otherwise be present as information overload and prioritize information flows so that the most important information can be provided at an optimal time, based on whether it meets a priority threshold. This priority can be determined by the priority of a condition as determined by the analyst based on the most important information to make a decision related to criticality. If a priority threshold is not satisfied, information is not transmitted to condition monitor 18, nor to target actors. In time sensitive situations where information overload is present, priority can become an effective filter.

Information processing system 40 integrates in its processing system infrastructure: the use of model-based information communications; the use of adaptive notifications; and the use of data to detect information disconnects between actors. Model-based information communications allow information that has changed state to be transmitted. In an environment where information sources (sensors) become significant, their demands on communications channels will increase. As communications channels become saturated, processing integrity can become compromised. Model-based communications minimize the communications bandwidth in these situations. Adaptive notifications permit alternative presentations of information with the intention of advising an actor as to the nature and severity of a safety issue. As notifications are incorrectly processed or ignored, notifications can adapt to re-present information in an alternative format or escalate the notification as the safety issue becomes increasingly more serious. An adaptive notification can be generated by the condition. Through novel information sources such as eye-trackers, it becomes possible to model what an actor is doing, and through those actions what the actor thinks or believes or other metrics regarding priority of response. By integrating novel information sources with more traditional information sources, informational disconnects between an actor and the environment can be detected. As specific informational disconnects are detected, tailored notifications can be created and then sent to multimedia notification terminals for presentation. Information disconnects are detected by mental models that can be created and maintained by the information processing system. Mental models can be compared to other mental models and disparities can be noted as information disconnects.

Figure 2:
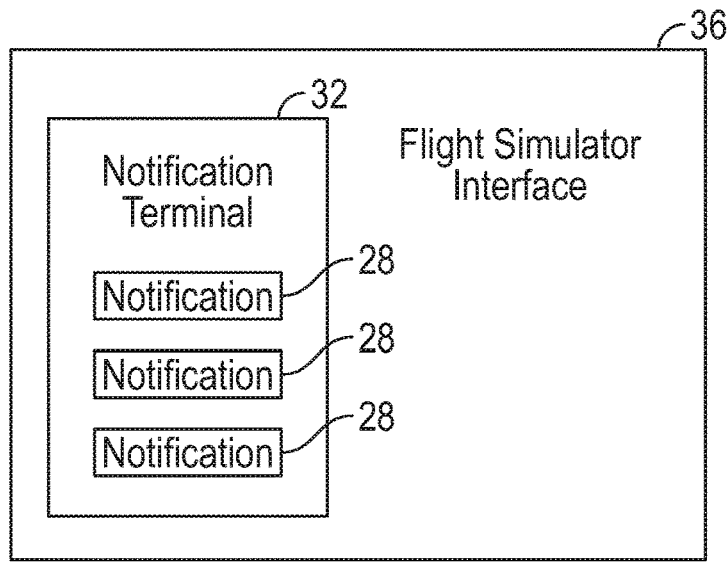
FIG. 2 shows an information processing system interface in operation according to one embodiment of the present invention.

Referring now to FIG. 2, flight simulator interface 36 is illustrated according to one embodiment of the present invention. Notifications 28 appear separately to an exemplary operator in a prioritized order on an Android tablet running the notification terminal 32 which can display notifications 28 in a multimedia format, e.g., both audio-visual and textual notifications.

When information processing system 40 (not shown) is deployed to operational environments such as flight simulator interface 36 or flight decks as in FIG. 2, it operates independently of the existing systems, e.g., flight deck systems, except that information processing system 40 has access to data identified by metadata workbench 101 (not shown), and receives this data from information source 26 (not shown). Such independent operation in this instance means that information processing system 40 may have no control inputs to monitored systems and that notifications are of an advisory or alerting nature. Access can be in the form of a wireless connection or direct wired network access to an avionics bus or aircraft data bus. Information processing system 40 will have no operational control of nor write access to any the monitored system's hardware or software components. Additionally, in one embodiment, notification terminal 32 will not impose additional monitoring responsibility on an exemplary flight crew except for when safety issues surface, at which point, the predefined information may be presented and displayed or otherwise presented to inform the exemplary flight crew. Once the exemplary safety issue has been resolved, information processing system 40 may return to a monitoring state.

Figure 3:
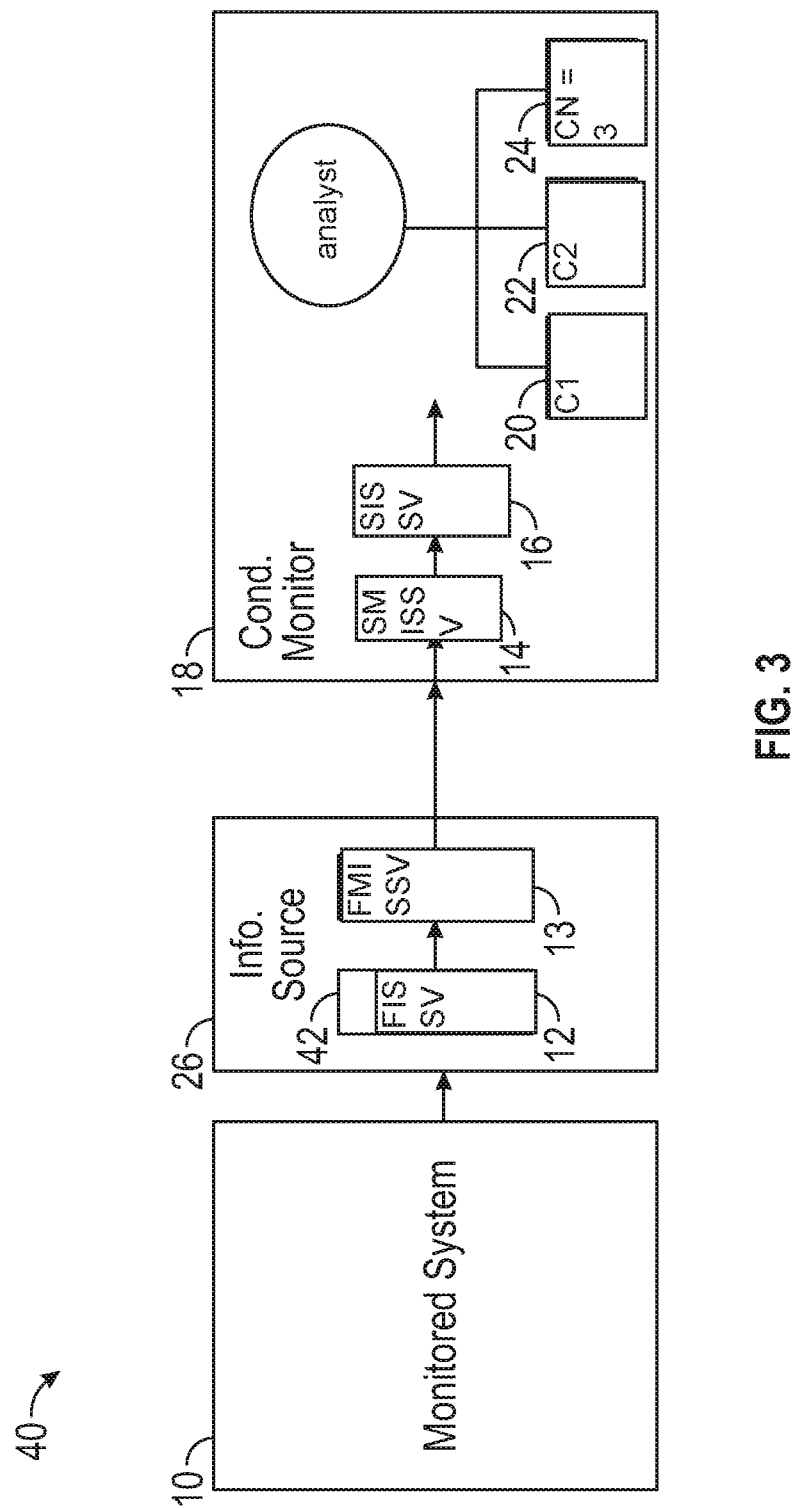
FIG. 3 shows an information flow from a system to a condition monitor with information state vectors according to one embodiment of the present invention.

Referring now to FIG. 3, an information flow from a monitored system 10 is illustrated via an information source 26 through state vectors including first information source state vector 12, first modified information source state vector 13, which is transmitted (for example, via a network) to second modified information source state vector 14, and communicated to second information source state vector 16 located in condition monitor 18 such that the information, capturing a moment in time, resides in condition monitor 18.

In one embodiment, information processing system 40 is provided read-only access to the state data, e.g., the aircraft speed and/or eye tracking data of the pilot, of monitored system 10 via a networking capability. Provided is the first part of a simple data flow through information processing system 40 starting from monitored system 10. Initially, monitored system 10 is monitored, and each instrument state change 42 is recorded as exemplary first data and contained in first information source state vector 12. If first information source state vector 12 is a modification of the previous value, it is copied to first modified information source state vector 13. Information source 26 processes (for example, compresses and encrypts) first modified information source state vector 13 and transmits it via a network connection to second modified information source state vector 14 at condition monitor 18, where it is further processed (for example, decompressed and decrypted) and then to second information source state vector 16. At this point second information source state vector 16 should be identical to first information source state vector 12, this data representing a snapshot in time. First modified information source state vector 13, and second modified information source state vector 14 transmit changes in the vectoral data structure. This is how information processing system 40 implements model-based communications, where state changes that modify a value are processed. There can exist multiple information source state vectors each representing the state of an external modeled system. For example, there can be an information source state vector for the mental model of the pilot flying, another for the mental model of the pilot monitoring, and yet another for the eye-tracking information of each pilot.

Condition monitor 18 may be in close proximity to information sources 26 of monitored system 10. Condition monitor 18 is provided operational information to establish a communications channel with available information sources 26. Condition monitoring is a process in which first, information updates in the form of data from first information source state vector 12 and second information source state vector 16 are received as conditions, e.g., condition one 20, condition two 22, to condition N 24, by condition monitor 18. Second, conditions of interest are determined. A condition is a function that has well-defined parameters. If a state change modifies one of the parameters, the condition must be evaluated. Conditions can be evaluated in order of priority. The order of priority can be determined by subject matter experts. Third, the conditions of interest are invoked in the determined priority order. Fourth, if a condition is evaluated true for having reached a priority threshold, notification 28 (not shown) is created, and then notification 28 is transmitted to specified notification terminal(s) 32 (not shown). Any responses from the notification terminal(s) 32 are processed and transmitted back to the condition monitor 18.

Figure 4:
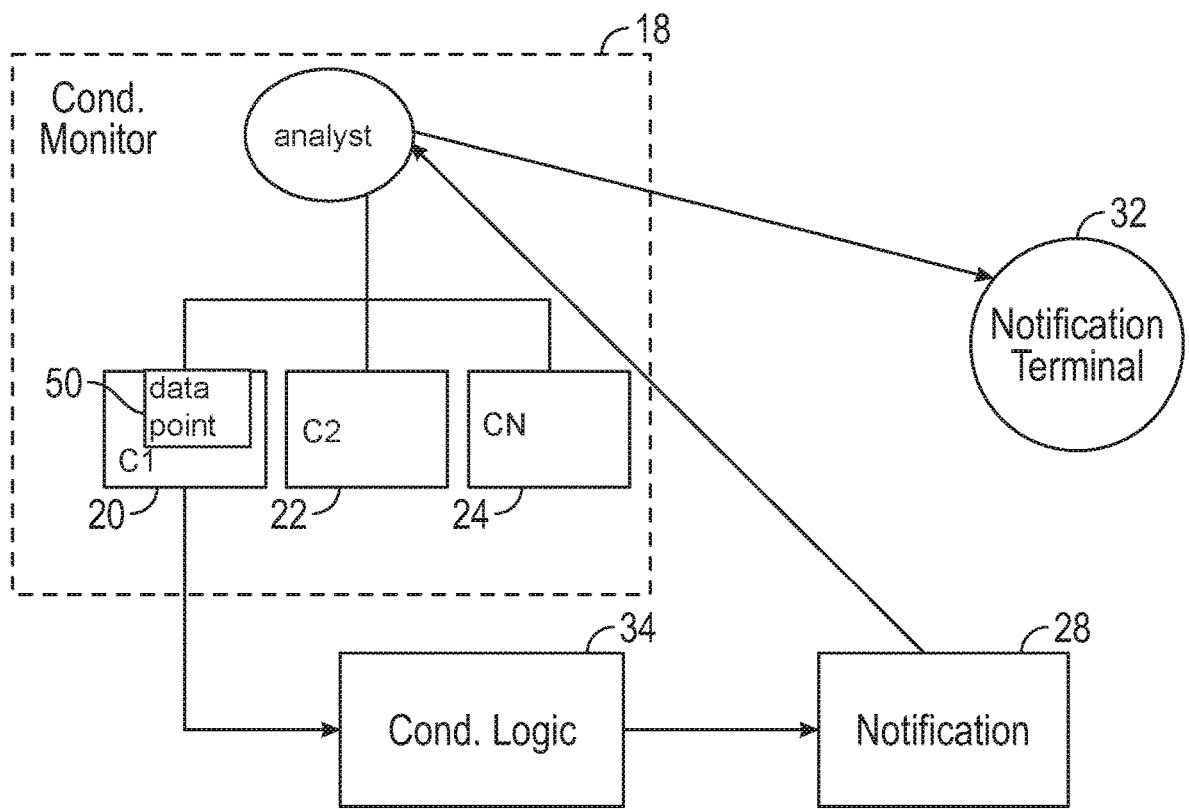
FIG. 4 shows the condition monitor processing of a relevant condition and an exemplary notification being transmitted to a notification terminal according to one embodiment of the present invention.

Referring now to FIG. 4, condition monitor 18 is illustrated receiving and processing an exemplary threshold value as data point 50. Condition monitor 18 knows which conditions require data point 50 in its evaluation and invokes each relevant condition of interest, e.g., condition one 20, condition two 22, and condition N 24. The conditions of interest, e.g., condition one 20, provide logic, e.g., exemplary condition logic 34 for identifying a safety issue based on an exemplary threshold value, and can include a safety description, priority, evaluate method, and notification string to output, e.g., notification 28. If condition logic 34 results in a positive value, condition monitor 18 requests the corresponding notification 28, which is then communicated to notification terminal 32 where it can be displayed.

In another embodiment, condition monitor 18 requests notification 28 from condition one 20. Condition monitor 18 transmits notification 28 to notification terminal 32. Notification 28 is a form of communication intended for a target actor for which an explicit or tacit response may be employed to terminate notification 28. Adaptive notifications are provided, which means that if the target operator to whom notification 28 is displayed does not take appropriate or expected action, notification 28 adapts and presents itself again. Notification 28 can continue to adapt, or can alternatively be transmitted to a higher authority to take some action. In one embodiment, notification 28 can be compressed and encrypted before being transmitted. Further still, a network communications protocol that guarantees timely transmission can be used. Furthermore, in one embodiment, logic may be added to prevent a repeating notification at notification terminal 32.

Figure 5:
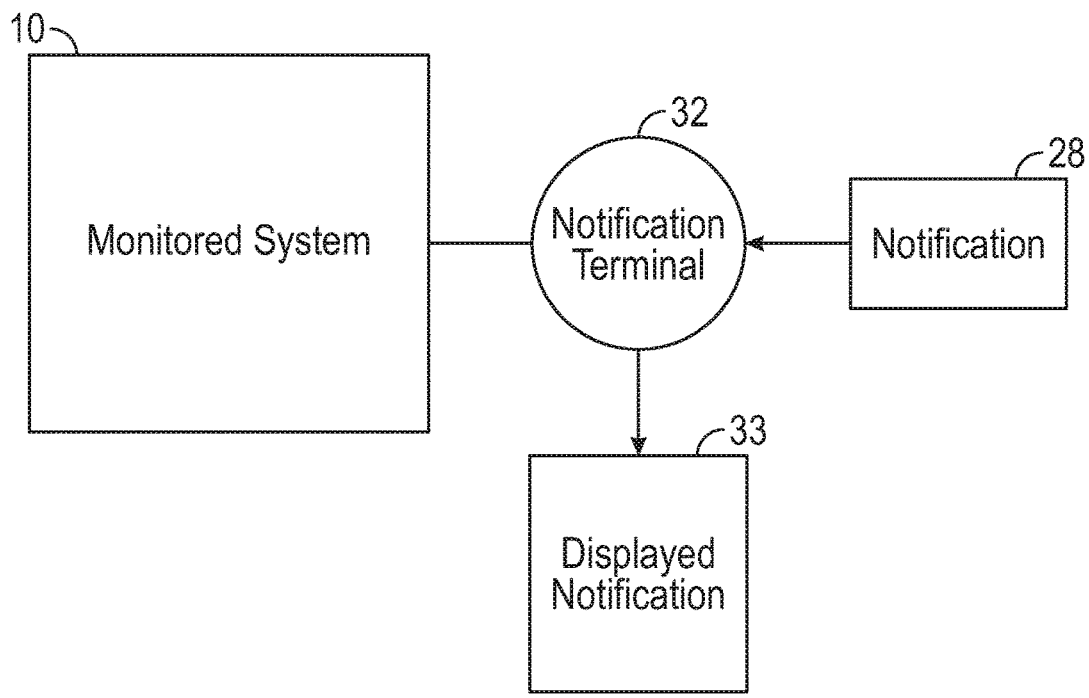
FIG. 5 shows an exemplary notification on a notification terminal on a flight deck according to one embodiment of the present invention.

Referring now to FIG. 5, notification 28 is illustrated being communicated to notification terminal 32 and transmitted to displayed notification 33. Notification 28 is an information bundle of data that will contain transmitted data provided by the condition, and may be displayed by notification terminal 32. In one embodiment, the information bundle containing notification 28 can contain justification information, e.g., information encoding whether a given parameter is near or within a prescribed threshold of criticality, as well as the notification string output. In another embodiment, the presentation format can be retained on notification terminal 32. In other words, the format can be predetermined and can be understood by the device that renders notification 28, e.g., notification 28 can deliver a text message to a device that can convert the text to a female voice speaking at a particular rate. Notification terminal 32 is a device that can provide a multimedia signal to the target actor. Notification terminal 32 receives notification 28 communicated from condition monitor 18 (not shown) and presents information in the form of displayed notification 33 to the actor via notification terminal 32, independent of standard avionics. According to one embodiment, while notification terminal 32 is independent of standard avionics, e.g., a flight deck, in another embodiment, it could use standard avionics.

In one embodiment, notification terminal 32 was embedded as an application on an electronic flight bag docked to but independent of monitored system 10. Information and context along with the justification can be presented by notification terminal 32 in multimedia format using static or dynamic media including but not limited to: image, video, audio, text, or user interface components. Notification terminal 32 may, but need not, require the actor to confirm receipt of information, notify other actors of intentions and actions to be taken, or quickly generate queries that will permit rapid confirmation of developed information flow models or situational assessments. To ascertain actor receipt of information, the information processing system 40 (not shown) can record a correct action being taken based on a recorded response by the actor or operator, or a change in the one or more conditions being monitored. A correct action in the form of a recorded response to notification 28 displayed on notification terminal 32 could include, but is not limited to, an optional explicit response, e.g., acknowledgement that notification 28 was received, or a tacit response, e.g., an action that is consistent with correcting the safety issue. Note that acknowledgement could include refutation of notification 28. Alternatively, monitoring of the action could be performed by adding new conditions. Notification terminal 32 would preferably not present information of a routine nature but rather presents information that may be safety critical or responsive to safety.

The content of notification 28 may be dependent on the form of the safety issue, may be adjusted based on the load of the target actor, and can be closely tied with the format of notification 28 and the notification type. Notification formats and types may follow currently defined regulatory or industry-recommended formats, e.g., those defined by the Federal Aviation Administration, however, they may also be considered in terms of any multimedia data type. In one embodiment, textual, speech synthesis, and audible tone type notifications have been implemented. Other possible notification types could include but are not limited to image, animation, video, holographic.

In one embodiment, while processing notification 28, a simultaneous second exemplary notification (not shown) could be generated, where the simultaneous second exemplary notification may be received at notification terminal 32 while notification 28 is being processed. This may invoke priority considerations whereby priorities can be considered at condition monitor 18 (not shown) before the simultaneous second exemplary notification is sent, and at notification terminal 32 before notification 28 is issued. The consideration of priorities is intended to prevent the transmission of lower priority notifications as a communications channel becomes saturated. In one embodiment, filtering notifications could comprise either ignoring the notification, for example, if the condition that gave rise to the notification is no longer valid, or queuing the notification. In another embodiment, notifications may be either overlapped as they are received, or issued one-by-one.

In another embodiment, metadata workbench 101 (not shown) can be used to develop notification content and the interface that an exemplary condition will use to create and transmit an exemplary notification to an exemplary notification terminal 32 (FIG. 2). Once an exemplary analyst is satisfied that an exemplary condition is ready to be fielded, the exemplary condition monitor is located or created. The exemplary condition is then deployed to the exemplary condition monitor.

INDUSTRIAL APPLICABILITY AND EMBODIMENTS

Embodiments of the present invention are further illustrated by the following non-limiting examples.

In one embodiment, the information processing system could be applied without architectural modification to areas where time sensitive decision making in a resource-constrained environment exist. Such areas could include integration and implementation in battlefield command and control nodes, as well as in emergency or disaster response coordination and resource allocation. For example, while an embodiment of the present invention described in the figures is directed to use with respect to aircraft flight decks, other embodiments of the present invention may also be useful in other applications in which complex information may be processed by one or more actors quickly, such as for military personnel, energy production personnel, manufacturing personnel, etc.

One embodiment of the present invention provides in an environment such as an in-flight emergency, information overload can become an important factor in the processing of information. In such states, one can reduce the information flow via model-based communications. Information flows in the form of notifications can likewise be prioritized to present certain information first in a form that can be immediately understood by the intended audience. As a situation becomes increasingly critical, information can be prioritized, filtered, and presented in a form that permits rapid situational assessment. If the information processing system assesses that an expected response action is not taken, the information processing and notifications can continue to be modified and presented until the correct action is taken. Another embodiment of the present invention provides that the information processing system can factor in how information along with context and a justification may allow agents to efficiently process incoming information, and ultimately facilitate in agents making faster and higher quality decisions.

In an embodiment, conditions were developed using a reactive model post-analysis of accidents and incidents where the error chain of events was identified, information to prevent the event was identified, and finally, a condition developed that detected circumstances for a possible safety failure so that a notification could be transmitted to the actor who would then take the appropriate action to break the error chain.

In one embodiment, test data used in the information processing system includes publicly available National Transportation Safety Board (NTSB) flight data recordings of actual accidents. However, flight data recording is not specific to NTSB. Other potentially useful sources of errors could include flight training environments, research and development environments, and incident reports such as NASA Aviation Safety Reporting System reports.

In an embodiment, the metadata workbench provides a framework for integration testing of components of a commercial flight simulator. For example, the metadata workbench has been used to implement flight data recording data for simulator data. A data player for the data was developed that loads each record in time order, delays by an appropriate amount consistent with the difference in timestamps, and then transmits the data to an information source interface which then makes the data available to the rest of the information processing system. An information source interface was written that makes data from a flight simulator available to the rest of the information processing system.

In an embodiment, the information processing system operating at the National Airspace System level could include operations with air traffic controllers at variable levels, including ground control, tower, and other centers. In the case of a training application, the information processing system operating in a flight training environment would monitor students for frequently encountered misconceptions and for their progression through the misconceptions or their tendency to make the same misconception via patterns in learning behavior modelling, on a per-student basis. These misconceptions via the patterns in learning behavior may then be reported to the flight instructor who could then provide additional or alternative training.

The information processing system supports the transition to autonomy by providing prioritized information to an operator. As autonomous UAV (Unmanned Aerial Vehicle) systems continue to develop, there will be situations where autonomy will fail. While fail safe routines generally kick in to prevent an accident, a human operator may step in and potentially perform a better recovery of the autonomous vehicle. The information processing system can optimize the time for a human operator to develop a complete and accurate situational assessment and perform the appropriate recovery actions by providing prioritized information. The recovery actions themselves could also be monitored to make sure an anomalous condition does not become a safety critical condition.

In an embodiment, the information processing system could use a system's state data combined with condition monitors tailored to the specific application and physiological data that can help determine the mental state of the operator. This can be applied to any system with an operator in the form of decisional mapping. In practice, systems or vehicles in which safety is paramount might be the best applications in which to integrate the information processing system. Monitored systems, for example, airplanes, UAVs, air traffic control, automobiles, ships and others, are among the potential benefactors of the information processing system.

In another embodiment, the information processing system can be installed on commercial airliners where it can be effective in breaking error chains that would lead to airplane accidents and their accompanying loss of life.

In one embodiment, through the accident analysis process, an exemplary information disconnect between a pilot and the capabilities of an aircraft was identified: in an exemplary scenario where data was obtained from a flight, the pilot did not know that the aircraft was unable to execute a go-around and the last moment of being able to execute the go-around had lapsed several seconds prior to a decision being made. This accident analysis led to the development of a new condition based on energy management. Energy management was identified as a factor in accident prevention and expanded to include insufficient energy to perform the go-around and too much energy to perform a safe landing.

In another embodiment, performing a safe landing was expanded to include environmental factors such as precipitation or ice on the runway. Conditions can be developed that can detect these states in a complete, correct, and timely manner.

In one embodiment, artificial intelligence can identify an exemplary disconnect between a pilot and the capabilities of an aircraft and then develop a condition with similar or better results than what would be a traditional approach, e.g., one manually created by a subject matter expert. In this embodiment, it may be possible to anticipate safety issues a priori. This approach could enable an operator or a number of operators to react appropriately in a timely manner, resulting in an improvement in situational outcomes.

In an embodiment, the information processing system can function as a system and actor monitoring, information processing, and decision support tool that focusses on safety in air operations where various aspects of information processing by flight deck agents are modelled. These models can then be compared to root causes for accidents, incidents, near misses, regulatory offenses, or even rogue behavior. The models can include both correct or expected behaviors, and also inaccurate, inconsistent, or confused behaviors. Once the models are developed, they can be compared to actual flight deck observations. As deviations are detected, well-defined actions are promptly taken and responses are carefully monitored. The model of the environment for each actor is updated through information flows with other actors. Some actors may have models of other actors. These actors can monitor information or processes. For example, using the data and information outputted by the information processing system, a computational actor such as a safety pilot may monitor how often and how completely a human actor such as a pilot monitors flight instruments. If the computational actor detects that a human actor, e.g., pilot, is distracted, it updates its model of the pilot. It can generate information for the pilot in the form of a predefined notification to correct its behavior. If the response of the pilot to the notification is not timely enough or is inconsistent with expected behavior, the computational actor can continue to adjust its model of the pilot. At a certain point in this process, a computational actor might be able recognize rogue behavior. The computational actor might then generate additional information for other external actors, such as an air traffic controller, in the form of other predefined notifications, to alert other external actors to the possible rogue behavior.

In another embodiment, collaborative external actor processing can detect rogue behavior. Possible explanations being offered for rogue behavior could be refuted or confirmed by the systems, e.g., aircraft systems, external systems, or other entities, e.g., aircraft or air traffic controllers, in the vicinity. Inconsistencies could raise potential alerts and generate additional conditions of interest, which would then result in heightened monitoring and preparations for taking remedial action.

In one embodiment, conditions can contain logic containing priority information, located in the metadata workbench as dependent on the severity of the safety condition being violated. The priority logic or criticality can be defined as the condition develops within the metadata workbench and can be a function of consequence when the condition is not being resolved correctly. E.g., three classifications could include: 1) imminent severe structural damage or loss of life, 2) severe structural damage or loss of life should no action be taken, or 3) impending violation of policy or regulation. Additionally, condition priorities can be inherently dynamic. For example, a condition's criticality could depend on other factors, e.g., a stall condition at altitude is not necessarily fatal, and therefore would be in the third exemplary category; whereas, a stall condition on short final approach can be lethal, and would therefore be in the first exemplary category. For processing by a condition monitor, priority would impact the order and the frequency at which conditions are evaluated. Further, in an embodiment, condition evaluation could be modeled and implemented using computer operating system scheduling algorithms.

In an embodiment, software may be written towards making the software usable by NASA, commercial vendors, military applications, full autonomy systems, automotive safety, process control, security, university, and industry researchers, including the FAA, aircraft manufacturers, avionics manufacturers, and flight training simulation manufacturers.

In an embodiment, implementation can be integrated into existing simulation environments, e.g., airborne environments, and deployed onto operational systems on an experimental basis, e.g., to enhance the quality of flight training environments.

One embodiment of the information processing system seeks to identify and correct information processing disconnects between actors operating in an aircraft's flight deck environment. These disconnects are directly involved with faulty action or inaction taken by actors and become part of the error chain which eventually leads to an aircraft accident or incident. By identifying disconnects, adaptive notifications can be used to improve the situational assessment of actors which would then lead to a breaking of the error chain. Adaptive notifications in one embodiment would not duplicate preexisting flight deck notifications such as avionics indications, audible alerts, or mechanical stimuli, but can detect these and the possible lack of remedial action taken by the intended audience/actor/agent to present an alternative, enhanced notification that will alert the actor/agent to immediately take the correct action.

In an embodiment, a rule-based expert system and other artificial intelligence approaches may be generated through the information processing systems' information sources that can make inferences of possible unsafe conditions using a temporal knowledge base populated by propositional statements. A temporal knowledge base is one that updates with time and contains facts that are consistent with a changing environment.

In an embodiment, the information processing system may be designed and developed for maximum adaptability to future applications and operating environments. Additionally, the information processing system may be used either standalone, or be a subsystem of a larger, integrated system. Accordingly, the system will apply software requirements that will maximize the applicability of the information processing system to future applications and operating environments without adding undue complexity to the software and minimizing existing time or space performance overhead.

In an embodiment, software encoded on the information processing system may be capable of modeling operator belief, decisions, capabilities, and obligations.

In an embodiment, the information processing system analyses data from information sources, including but not limited to environmental data, physiological data, and abstract data such as mental decisional modelling of the operator, actor, or agent.

In one embodiment, information source metadata can include network identification, account name, password or credentials, protocol, communications parameters, data formats, requested data, compression and encryption, frequency of updates, and information change thresholds. Frequency of updates informs the information source how often information should be transmitted. An information change threshold may tell the information source to transmit information when a change exceeds a specified threshold. When a condition monitor is operational, it can initiate communications with information sources. When communications are established, the condition monitor can notify the information source of what information may be requested, how it is to be transmitted and under what circumstances information should be transmitted.

In an embodiment, the information processing of the information processing system can be considered from the perspective of either an information source or information metadata. The information source can provide information to conditions through the containing condition monitor. The information source can be any hardware component, software component, or actor along with any identification attributes such as hostname or IP address, and the medium protocol used to establish, maintain, process, and terminate communications with the information source. Information metadata can describe attributes associated with the data that is being communicated. For example, information metadata can include the attributes of name, data type, range of values and reserved values and associated semantics, accuracy/precision, update frequency, cost to collect, and permissions. The information source may provide an interface that allows functions, including providing a list of properties whose values can be monitored, adding a subscriber, removing a subscriber, notifying a subscriber of a change in the value of a property, supporting design time integration support.

In an embodiment, for a pre-existing information source, the information processing system can integrate with little impact on the monitored system, with the exception of extracting data from the system. In another embodiment, an information processing system compliant wrapper may be constructed around an information source, thus providing interfacing with the information processing system both during design time and during operations.

In an embodiment, a condition can be a defined set of Boolean terms that constrain the environment in which a situation exists, e.g., where a situation may be unsafe. An exemplary condition can have a name, a description, a category, roles, and terms. The name can be a system-wide uniquely defined string that identifies the condition. The description can be a sentence fragment that briefly and intuitively describes what the condition is looking for. The category permits related conditions to be grouped together, which can be more easily sorted relatively in terms of priority. The roles define the contributing sources of information used in the evaluation of a condition. A condition's roles are placeholders for actors who will be an information source, thereby providing information that is used in the Boolean terms. The Boolean terms are the specific states that are being examined. The Boolean terms can be defined as a prose or as a predicate function. A Boolean term described in prose may be defined as another condition where the description is the same prose. A predicate function is an operation on specific information that returns a Boolean result and operates identically to a mathematical or programming function. A predicate function can contain a name, parameters, and Boolean terms. The name can be used to define and call a predicate function. The parameters can be input values to the predicate function, where parameters can optionally be considered immutable. The Boolean terms can be the operations performed on the parameters which evaluate to a Boolean result. The Boolean term may be another predicate function, but it cannot be another condition. In one embodiment, a set of predicate functions are predefined by the information processing system, and conditions may eventually be defined as a predicate function or a combination of predicate functions. If a condition at the highest system level evaluates to true, an unsafe situation exists. Exemplary sources of Boolean terms for conditions can be found in documents, regulations, and checklists.

In an embodiment, correct conditions can be developed to understand their own limitations; can be complete, e.g., able to handle variable situations including those unanticipated; can be attainable, e.g., implementable using current technology; can be efficient, e.g., able to function in an operational environment; can be intuitive, and can preferably generate no false positives.

In one embodiment, information flows can be prioritized to limit the amount of consumed communications bandwidth. The resulting notifications can be highly abstracted and can contain the information needed to make the critical decision. Not all information flows need be transmitted. For example, in an emergency situation, information required to safely fly an aircraft can be discounted or ignored in order to process other information significant to the overall outcome of the flight. A specific example would be ditching in a river because of a catastrophic engine failure. Engine information is no longer relevant and need not be transmitted.

The preceding examples can be repeated with similar success by substituting the generically or specifically described operating conditions of the embodiments of the present invention for those used in the preceding examples.

In at least one embodiment, and as readily understood by one of ordinary skill in the art, the apparatus according to one embodiment of the present invention will include a general or specific purpose computer or distributed system programmed with computer software implementing the steps described above, which computer software may be in any appropriate computer language, including C++, FORTRAN, BASIC, Java, assembly language, microcode, distributed programming languages, etc. The apparatus may also include a plurality of such computers/distributed systems (e.g., connected over the Internet and/or one or more intranets) in a variety of hardware implementations. For example, data processing can be performed by an appropriately programmed microprocessor, computing cloud, Application Specific Integrated Circuit (ASIC), Field Programmable Gate Array (FPGA), or the like, in conjunction with appropriate memory, network, and bus elements.

Note that in the specification and claims, "about" or "approximately" means within twenty percent (20%) of the numerical amount cited. Computer software disclosed herein may be embodied on any computer-readable medium (including combinations of mediums), including without limitation CD-ROMs, DVD-ROMs, hard drives (local or network storage device), USB keys, other removable drives, ROM, and firmware.

Although embodiments of the present invention have been described in detail with particular reference to these embodiments, other embodiments can achieve the same results. Variations and modifications of embodiments of the present invention will be obvious to those skilled in the art and it is intended to cover in the appended claims all such modifications and equivalents. Other vehicles such as spacecraft, helicopters, boats, or other operator operated vehicles. The entire disclosures of all references, applications, patents, and publications cited above are hereby incorporated by reference.

What is claimed is:

1. An information processing system integrated on a monitored system, the information processing system comprising:
    an information source capable of i) receiving metadata from the monitored system, and ii) transmitting that metadata to a metadata workbench or to a condition monitor, said metadata workbench capable of communication with said condition monitor, said information source, and a notification terminal and wherein said metadata workbench is capable of reading instrument state changes of the monitored system;
    said information source comprising a first information source state vector and a first modified information source state vector, said first modified information source state vector capable of processing the metadata and transmitting the metadata to said condition monitor, wherein said first modified information source state vector receives the metadata from said first information source state vector;
    said condition monitor capable of receiving the metadata from said first modified information source state vector as one or more conditions encoded as a data point, monitoring said one or more conditions encoded as the data point for meeting a threshold, obtaining one or more relevant notifications from said one or more conditions, and sending said one or more relevant notifications to said notification terminal; and
    said notification terminal capable of prioritizing said one or more relevant notifications and deploying one or more notifications of said one more relevant notifications meeting a prioritization criteria for display as a displayed notification on said notification terminal of said information processing system and wherein said condition monitor comprises a second modified information source state vector and a second information source state vector, said second modified information source state vector capable of receiving information from said first modified information source state vector, further processing the metadata received from said first modified information source state vector and communicating the further processed metadata to said second information source state vector.

2. The information processing system of claim 1 wherein said information processing system reduces information overload via model-based information communications.

3. The information processing system of claim 1 wherein said notification terminal comprises a display screen capable of displaying the one or more relevant notifications as a multimedia message.

4. The information processing system of claim 1 wherein said displayed notification is displayed on a flight simulator interface.

5. The information processing system of claim 1 wherein said notification terminal is electronics that can render said one or more relevant notifications.

6. The information processing system of claim 1 wherein said information processing system is further comprised of software.

7. The information processing system of claim 1 wherein said information processing system is further comprised of hardware.

8. The information processing system of claim 1 wherein the monitored system is a flight simulator interface.

9. The information processing system of claim 1 wherein the processing of the metadata by said first modified information source state vector comprises compressing and encrypting.

10. The information processing system of claim 1 wherein said second modified information source state vector is in communication with said first modified information source state vector via a network connection.

11. An information processing system integrated on a monitored system comprising:
    an information source capable of i) receiving metadata from the monitored system, and ii) transmitting that metadata to a metadata workbench or to a condition monitor, said metadata workbench capable of communication with said condition monitor, said information source, and a notification terminal and wherein said metadata workbench is capable of reading instrument state changes of the monitored system via model-based information communications;
    said information source comprising a first information source state vector and a first modified information source state vector, said first modified information source state vector capable of transmitting the metadata to said condition monitor, said first modified information source state vector capable of processing the metadata, wherein said first modified information source state vector receives the metadata from said first information source state vector;
    said condition monitor comprising a second modified information source state vector and a second information source state vector, said second modified information source state vector capable of receiving information from said first modified information source state vector that is capable of communication with said second modified information source state vector, further processing the metadata from said first modified information source state vector and communicating the further processed metadata to said second information source state vector;
    said condition monitor capable of one or more of i) receiving metadata as one or more conditions encoded as a data point from said information source, ii) monitoring said one or more conditions encoded as the data point for meeting a threshold, iii) obtaining one or more notifications from said one or more conditions, wherein said one or more notifications present safety information, said threshold determined by safety considerations uniquely encoded for specifics of the monitored system, iv) sending said one or more notifications to said notification terminal as said threshold is met, and v) adapting said one or more notifications into various multimedia formats as said one or more notifications obtain no correct action from a target operator; and said notification terminal capable of prioritizing said one or more notifications and said one or more notifications meeting a prioritization criteria for display as a displayed notification, and re-presenting said one or more notifications in various multimedia formats based on a prioritization or level of urgency determined by said notification terminal.

12. The information processing system of claim 11 wherein the monitored system is a flight simulator interface.

13. The information processing system of claim 11 wherein said notification terminal is electronics that can render said one or more notifications.

14. The information processing system of claim 11 wherein said information processing system is comprised of software.

15. The information processing system of claim 11 wherein said information processing system is comprised of hardware.

16. A method for obtaining information from an information processing system, said obtaining comprising:
integrating the information processing system of claim 1 onto a monitored system.

17. A method for processing information via an information processing system, the processing comprising:
receiving, at an information source, metadata from a monitored system or a metadata workbench via a first information source state vector;
transmitting the received metadata to the metadata workbench or to a condition monitor;
communicating the transmitted metadata to a first modified information source state vector at the information source;
processing the transmitted metadata at the first modified information source state vector;
transmitting the processed metadata to the condition monitor comprising a second modified information source state vector and a second information source state vector;
further processing the processed metadata at the second modified information source state vector;
communicating the further processed metadata to the second information source state vector;
comparing each of one or more conditions encoded as a data point to a threshold to obtain a safety analysis for each of the one or more conditions at the condition monitor;
sending one or more notifications to a notification terminal when the safety analysis of at least one of the one or more conditions evaluates an unsafe condition at the condition monitor;
prioritizing the one or more notifications at the notification terminal; and
deploying the prioritized one or more notifications for display as a displayed notification.

18. The method of claim 17 further comprising recording the received metadata at the information source and downloading the received metadata to the metadata workbench, the metadata workbench further communicating with the condition monitor, the information source, and the notification terminal.

19. The method of claim 17 wherein said transmitting the received metadata further comprises model-based information communications.

20. The method of claim 17 wherein processing comprises compressing and encrypting.

21. The method of claim 17 wherein further processing comprises decrypting and decompressing.

* * * * *